United States Patent
Madhav (10) Patent No.: US 10,620,128 B2
(45) Date of Patent: Apr. 14, 2020

(54) OXYGEN SENSOR HAVING A TIP COATED LARGE DIAMETER OPTICAL FIBER UTILIZING A TRICHROIC PRISM OR TRICOLOR SENSOR

(71) Applicant: Eaton Limited, Titchfield, Hampshire (GB)

(72) Inventor: Kalaga Madhav, Bangalore (IN)

(73) Assignee: EATON INTELLIGENT POWER LIMITED, Dublin (IE)

( * ) Notice: Subject to any disclaimer, the term of this patent is extended or adjusted under 35 U.S.C. 154(b) by 358 days.

(21) Appl. No.: 15/118,894

(22) PCT Filed: Feb. 17, 2015

(86) PCT No.: PCT/EP2015/053328
§ 371 (c)(1),
(2) Date: Aug. 15, 2016

(87) PCT Pub. No.: WO2015/121499
PCT Pub. Date: Aug. 20, 2015

(65) Prior Publication Data
US 2017/0030837 A1    Feb. 2, 2017

(30) Foreign Application Priority Data

Feb. 17, 2014 (GB) .................................. 1402734.6
Sep. 17, 2014 (GB) .................................. 1416438.8

(51) Int. Cl.
*G01N 21/77* (2006.01)
(52) U.S. Cl.
CPC ... *G01N 21/7703* (2013.01); *G01N 2021/772* (2013.01); *G01N 2021/773* (2013.01)

(58) Field of Classification Search
CPC ...................................................... G01N 21/77
(Continued)

(56) References Cited

U.S. PATENT DOCUMENTS 4,517,456 A * 5/1985 Halsall ................... H04J 14/02
                                                   250/226
4,709,144 A * 11/1987 Vincent ................. G01J 3/2803
                                                   250/226
(Continued)

FOREIGN PATENT DOCUMENTS

CN          100520372 C    7/2009
EP          0259951 A2     3/1988
(Continued)

OTHER PUBLICATIONS

Martin, R. et al, Spie 1992, 1648, 25-31.*
(Continued)

*Primary Examiner* — Arlen Soderquist
(74) *Attorney, Agent, or Firm* — Leydig, Voit & Mayer, Ltd.

(57) ABSTRACT

An oxygen sensor has an oxygen sensitive fluorescent material including an oxygen sensitive dye and an oxygen insensitive dye, the oxygen sensitive dye and an oxygen insensitive dye being fluorophores; and a large diameter optical fiber. The large diameter optical fiber includes a first end and a second end. The large diameter optical fiber is configured to transit photons and transmit emissions from one or more of the fluorophores upon excitation thereof. The oxygen sensitive fluorescent material is located on the first end of the large diameter optical fiber.

14 Claims, 5 Drawing Sheets

(58) Field of Classification Search
USPC .............. 422/82.06–82.08, 82.11; 436/136
See application file for complete search history.

(56) References Cited

U.S. PATENT DOCUMENTS

| | | | | |
|---|---|---|---|---|
| 4,712,865 | A * | 12/1987 | Hsu .................. | C08G 77/26 385/12 |
| 4,792,689 | A * | 12/1988 | Peterson ............ | G01N 21/643 250/227.23 |
| 4,810,655 | A * | 3/1989 | Khalil ................ | A61K 49/0013 250/459.1 |
| 4,861,727 | A * | 8/1989 | Hauenstein ........ | A61B 5/1459 436/136 |
| 4,900,933 | A * | 2/1990 | Nestor ................ | A61B 5/1459 250/252.1 |
| 5,039,491 | A * | 8/1991 | Saaski ................ | G01N 21/77 356/436 |
| 5,094,958 | A * | 3/1992 | Klainer .............. | G01N 21/648 250/227.23 |
| 5,094,959 | A * | 3/1992 | Allen .................. | A61B 5/1459 422/82.07 |
| 5,151,603 | A * | 9/1992 | Nakamura .......... | G01N 21/51 250/458.1 |
| 5,155,046 | A * | 10/1992 | Hui .................... | G01N 21/643 250/458.1 |
| 5,234,835 | A * | 8/1993 | Nestor ................ | A61B 5/1459 422/82.06 |
| 5,272,090 | A * | 12/1993 | Gavish ............... | G01N 21/643 356/402 |
| 5,462,880 | A * | 10/1995 | Kane .................. | G01N 21/643 422/82.07 |
| 5,728,422 | A | 3/1998 | Kane et al. | |
| 6,051,437 | A * | 4/2000 | Luo .................... | B82Y 15/00 422/82.05 |
| 6,142,855 | A * | 11/2000 | Nyui ................... | B24B 37/013 356/630 |
| 6,180,415 | B1 * | 1/2001 | Schultz .............. | B82Y 30/00 356/301 |
| 6,293,911 | B1 * | 9/2001 | Imaizumi ........... | A61B 1/00009 600/160 |
| 6,403,947 | B1 * | 6/2002 | Hoyt .................. | B82Y 10/00 250/226 |
| 6,610,848 | B1 * | 8/2003 | Pilato ................. | C07D 213/04 546/2 |
| 6,634,598 | B2 * | 10/2003 | Susko ................ | B64D 37/32 137/209 |
| 6,904,930 | B2 * | 6/2005 | Susko ................ | B64D 37/32 137/209 |
| 6,925,852 | B2 * | 8/2005 | Susko ................ | G01N 21/7703 73/23.2 |
| 7,352,464 | B2 * | 4/2008 | Chen .................. | G01N 21/3504 356/437 |
| 7,385,692 | B1 * | 6/2008 | Nguyen .............. | G01J 3/02 356/301 |
| 7,585,211 | B2 | 9/2009 | Qualy et al. | |
| 7,748,896 | B2 | 7/2010 | Dams et al. | |
| 9,170,163 | B2 * | 10/2015 | Susko ................ | G01D 11/245 |
| 9,298,193 | B2 * | 3/2016 | Susko ................ | G01D 11/245 |
| 2001/0002315 | A1 * | 5/2001 | Schultz .............. | B82Y 30/00 436/172 |
| 2002/0154857 | A1 * | 10/2002 | Goodman ........... | G02B 6/2713 385/24 |
| 2002/0164813 | A1 | 11/2002 | Colvin et al. | |
| 2003/0098918 | A1 * | 5/2003 | Miller ................ | H04N 9/045 348/273 |
| 2003/0116679 | A1 * | 6/2003 | Susko ................ | B64D 37/32 244/135 R |
| 2004/0035461 | A1 * | 2/2004 | Susko ................ | B64D 37/32 137/209 |
| 2004/0083793 | A1 * | 5/2004 | Susko ................ | G01N 21/7703 73/31.05 |
| 2004/0171094 | A1 | 9/2004 | Klimant et al. | |
| 2004/0186351 | A1 * | 9/2004 | Imaizumi ........... | A61B 1/00009 600/160 |
| 2005/0113657 | A1 * | 5/2005 | Alarcon ............. | G01N 21/7703 600/342 |
| 2005/0286054 | A1 * | 12/2005 | Chen .................. | G01N 21/3504 356/437 |
| 2006/0160241 | A1 | 7/2006 | Khalil et al. | |
| 2006/0171845 | A1 * | 8/2006 | Martin ................ | B64D 37/32 422/82.07 |
| 2007/0122311 | A1 * | 5/2007 | Shahriari ............ | C03C 1/008 422/82.11 |
| 2008/0159089 | A1 * | 7/2008 | Hiramatsu .......... | G11B 7/1275 369/44.14 |
| 2009/0091751 | A1 * | 4/2009 | Golovanevsky ... | G01N 21/9501 356/237.4 |
| 2009/0141280 | A1 * | 6/2009 | Lam ................... | G01N 21/783 356/436 |
| 2009/0166358 | A1 * | 7/2009 | Bose .................. | B01D 53/24 220/88.3 |
| 2010/0018119 | A1 | 1/2010 | Lam et al. | |
| 2010/0182415 | A1 * | 7/2010 | Elster ................. | A61B 90/361 348/77 |
| 2010/0225783 | A1 * | 9/2010 | Wagner .............. | H04N 5/2254 348/229.1 |
| 2012/0097270 | A1 * | 4/2012 | Susko ................ | G01D 11/245 137/551 |
| 2013/0102024 | A1 * | 4/2013 | Tian ................... | C12Q 1/04 435/34 |
| 2013/0155499 | A1 * | 6/2013 | Dixon ................. | G02B 21/002 359/385 |
| 2013/0206760 | A1 * | 8/2013 | Susko ................ | G01D 11/245 220/88.3 |
| 2013/0342674 | A1 * | 12/2013 | Dixon ................. | G02B 21/36 348/79 |
| 2014/0015953 | A1 * | 1/2014 | Turgeman .......... | G02B 21/16 348/79 |
| 2014/0016926 | A1 | 1/2014 | Soto et al. | |
| 2014/0180129 | A1 * | 6/2014 | Kostenich .......... | A61B 1/041 600/476 |
| 2014/0234984 | A1 * | 8/2014 | Juuti .................. | G01N 21/33 436/172 |
| 2014/0273043 | A1 * | 9/2014 | Tian ................... | G01N 33/66 435/14 |
| 2016/0022126 | A1 * | 1/2016 | Ramesh ............. | H04N 5/332 600/109 |

FOREIGN PATENT DOCUMENTS

| | | |
|---|---|---|
| EP | 0454886 A1 | 11/1991 |
| KR | 1020130124742 A | 5/2012 |
| RU | 2007118605 A | 11/2008 |
| WO | WO 9205441 A1 | 4/1992 |
| WO | WO 9508107 A1 | 3/1995 |
| WO | WO 0013003 A1 | 3/2000 |
| WO | WO 03046422 A1 | 6/2003 |
| WO | WO 2007022340 A2 | 2/2007 |
| WO | WO 2009052222 A1 | 4/2009 |

OTHER PUBLICATIONS

Lichtman, J. W. et al, Nature Methods, 2005, 2, 910-919.*

Chu C S et al: "Ratiometric fiber-optic oxygen sensors based on sol-gel matrix doped with metalloporphyrin and 7-amino-4-trifluoromethyl coumarin", Sensors and Actuators B: Chemical International Journal Devoted to Research and Development of Physical and Chemical Transducers, Elsevier S.A. CH, vol. 134, No. 2, Sep. 25, 2008 (Sep. 25, 2008), pp. 711-717, XP025429961.

Haibing Zhang et al: "Research Progress in Calenderable Fluorosilicone with Excellent Fuel Resistance", Jan. 1, 2007 (Jan. 1, 2007), XP055187043, Retrieved from Internet: URL: https://imageserv5.team-logic.com/mediaLibrary/00/Fluorosilicone-Paper-Website_1.pdf.

Andrew Mills: "Optical Oxygen Sensors Utilising the Luminescence of Platinum Metals Complexes", Platinum Metals Rev., vol. 41, No. 3, Jul. 1, 1997 (Jul. 1, 1997), pp. 115-127, XP055187034.

(56) References Cited

OTHER PUBLICATIONS

Haibing Zhang, et al. "The Permeability Characteristics of Silicone Rubber", Arlon Silicone Technologies Division, Dec. 2006, p. 1, sentence 2.
Nikolay Savenko, "Usiliteli s tokovoy obratnoy svyazyu", Sovremennya elektronika 2, Introduction, Dec. 2006, paragraph 5, sentence 1.
Office Action of the Russian Patent Office, Russian Application No. 2016135524/28(055656), completed Nov. 21, 2018.

* cited by examiner

OXYGEN SENSOR HAVING A TIP COATED LARGE DIAMETER OPTICAL FIBER UTILIZING A TRICHROIC PRISM OR TRICOLOR SENSOR

CROSS-REFERENCE TO RELATED APPLICATIONS

This application is a U.S. national stage application under 35 U.S.C. § 371 of International Application No. PCT/EP2015/053328, filed on Feb. 17, 2015, and claims benefit to British Patent Application No. 1 402 734.6, filed on Feb. 17, 2014, and British Patent Application No. 1 416 438.8, filed on Sep. 17, 2014. The International Application was published in English on Aug. 20, 2015, as WO 2015/121499 A1 under PCT Article 21(2).

FIELD

The present invention relates to an oxygen sensor.

BACKGROUND

It is known to use fluorescent quenching to indicate the presence of certain species of interest. A fluorescent material emits a specific wavelength and intensity of light which has a specific emission lifetime, upon excitation by a specific wavelength which is lower than the emitted wavelength. The intensity and lifetime of the emission is dependent upon the concentration of oxygen in contact with the fluorescent material. As the oxygen concentration increases the fluorescent emission intensity and lifetime decreases and the increase and decrease are directly proportional to one another.

Sensors used inside fuel tanks consist of a fluorescent material surface which is exposed to the fuel tank environment. A reduction in the fluorescent material's emission intensity and lifetime in the presence of oxygen gives a direct measure of oxygen concentration around the sensor surface. The fluorescent emission of a material that is electromagnetically excited decreases in direct proportion to the concentration of a species of interest. Materials such as platinum tetrakis pentafluorophenyl porphyrin and platinum octaethylporphyrin are used as gaseous oxygen sensing materials. However, the fuel tank environment is harsh and can cause the fluorescent material to degrade. This degradation of the material will result in a reduction in the intensity and changes in lifetime of fluorescent emission and this can be incorrectly interpreted as a higher oxygen level.

SUMMARY

An aspect of the invention provides an oxygen sensor for measuring an oxygen concentration in an aircraft application, the sensor comprising: an oxygen sensitive fluorescent material including an oxygen sensitive dye and an oxygen insensitive dye, the oxygen sensitive dye and an oxygen insensitive dye being fluorophores; and a large diameter optical fiber. The large diameter optical fiber includes a first end and a second end. The large diameter optical fiber is configured to transit photons and transmit emissions from one or more of the fluorophores upon excitation thereof. The oxygen sensitive fluorescent material is located on the first end of the large diameter optical fiber.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

An aspect of the present invention relates to an oxygen sensor and more particularly to an oxygen sensor for use in aircraft applications, more in particular fuel tank or air separation module applications.

An aspect of the present invention provides an improvement in measuring the concentration of oxygen. Aspects of the invention will be of particular use in measuring oxygen concentration in aircraft fuel tank ullage or air separation modules.

The process of fluorescence emission can be summarized as follows:

$$\text{Excitation}: L + h\nu_1 = L^* \qquad \text{(equation 1)}$$

$$\text{Fluorescence}: L^* = L + h\nu_2 \qquad \text{(equation 2)}$$

$$\text{Quenching}: L^* + O_2 = L + O_2^* \qquad \text{(equation 3)}$$

Equation 1 shows the process of electromagnetic excitation of a fluorophore by a photon with energy $h\nu_1$. Equation 2 shows the emission of a photon at energy $h\nu_2$ when the excited fluorophore $L^*$ returns to the de-excited state $L$ and wherein $h\nu_2 < h\nu_1$. In the presence of oxygen, the fluorophore transfers energy to the oxygen molecule through collision as is shown by Equation 3. This energy transfer does not release a photon in a process that is defined as quenching. The quenching of the excited fluorophore by an oxygen molecule results in the decrease of total intensity and lifetime of emission. It is this mechanism that has allowed an optical oxygen sensor to be developed. The sensors have found particular utility in aerospace fuel tanks but it has been found that when the sensor is exposed to liquid fuel the oxygen sensitive material degrades. Also, as the fluorescent material is exposed to fuel in a tank, the fluorophore can be masked by the hydrocarbon molecules in the fuel. This interaction can result in photo-bleaching which can result in an irreversible degradation of the fluorophore. If the fluorophore and oxygen do not interact then the overall emission intensity and lifetime increases. This increase can be incorrectly interpreted as a lower oxygen concentration. It will also be necessary to calibrate or reference the emission from the oxygen sensitive fluorophore.

An aspect of the present invention seeks to overcome the problems of the art by providing an oxygen sensor including an oxygen sensitive fluorescent material including a combination of: an oxygen sensitive dye and an oxygen insensitive dye, wherein both of the dyes are fluorophores. The oxygen insensitive dye could be silicon octaethylporphyrin. The oxygen sensitive dye could be platinum tetrakis pentafluorophenylporphyrin or platinum octaethylporphyrin. The two dyes can be dispersed in a polymer matrix, for example polydimethyl siloxane. Alternatively the material can be made using sol-gel xerogel process. Using this technique it is possible to disperse the material in a fuel resistant and oxygen permeable fluorosilicone rubber.

The oxygen sensitive dye and the oxygen insensitive dye can be excited at the same wavelength. Each of the dyes emits a different wavelength, intensity and lifetime to the other. Upon interaction with oxygen molecules the emission intensity and lifetime is reduced for the oxygen sensitive dye whilst that of the oxygen insensitive dye remains unchanged.

The sensor has a tip comprising of the combination of the oxygen insensitive dye and oxygen sensitive dye. The tip is at an end of a large optical diameter fiber. The other end of the large optical diameter fiber is connectable to a prism or sensors to separate the wavelengths. The large diameter fiber is housed in a tube, preferably made of steel. One end of the tube has a rubber membrane and one or more breather vents that prevent the liquid fuel from contacting the fluorophores but which do permit interaction between the fluorophores and oxygen. The membrane can be made of any suitable material which is resistant to aerospace fuel and which is permeable to gaseous oxygen, such as fluorosilicone rubber, polydimethyl siloxane.

An apparatus for transmitting the excitation light and to pick up the emissions from the oxygen sensitive fluorescent material includes an optical fiber. This fiber is preferably of a large diameter. The apparatus further includes a trichroic prism and two photodetectors or tricolor sensors such as integrated RGB sensors. The trichroic prism and two photodetectors or tricolor sensors such as integrated RGB sensors separate the three wavelengths; excitation, and the emission from each dye. The intensity or lifetime is converted into proportional currents. Transimpedance amplifiers are used to convert the currents into a voltage (V1) which is proportional to the intensity or lifetime of the emission from the oxygen insensitive dye and a voltage (V2) which is proportional to the intensity or lifetime of the emission from the oxygen sensitive dye. The excitation is pulsed in order to measure the lifetime of the emission. Typically, the fluorescent lifetime is between 70 and 100 µs and is monitored for a known time. It is possible to measure both the lifetime and the intensity together.

During operation of the sensor, the voltages (V1 and V2) are compared with each other to infer the performance of the oxygen sensitive fluorescent material. As the oxygen level increases, V2 decreases and V1 remains unchanged. If the material degrades with no change in the oxygen concentration then V1 and V2 will decrease together. The material's performance, oxygen concentration and sensitivity can be calibrated by the ratio of V1/V2. This comparison of voltages is effectively an in-built self-check.

Figure 1:
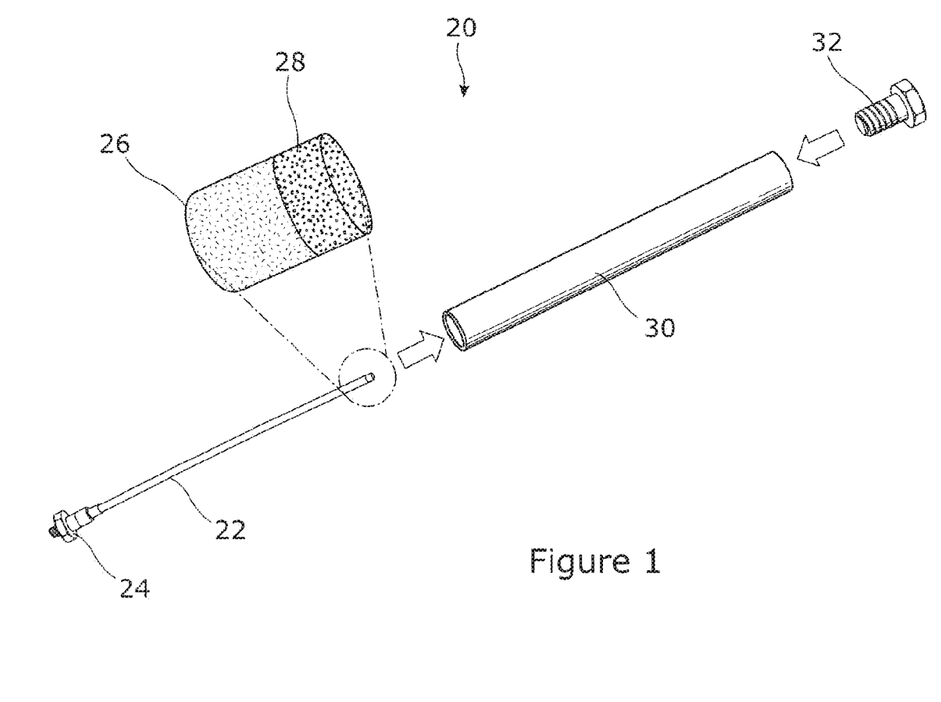
FIG. 1 shows a sensor probe having a sensor according to the present invention.
Figure 5:
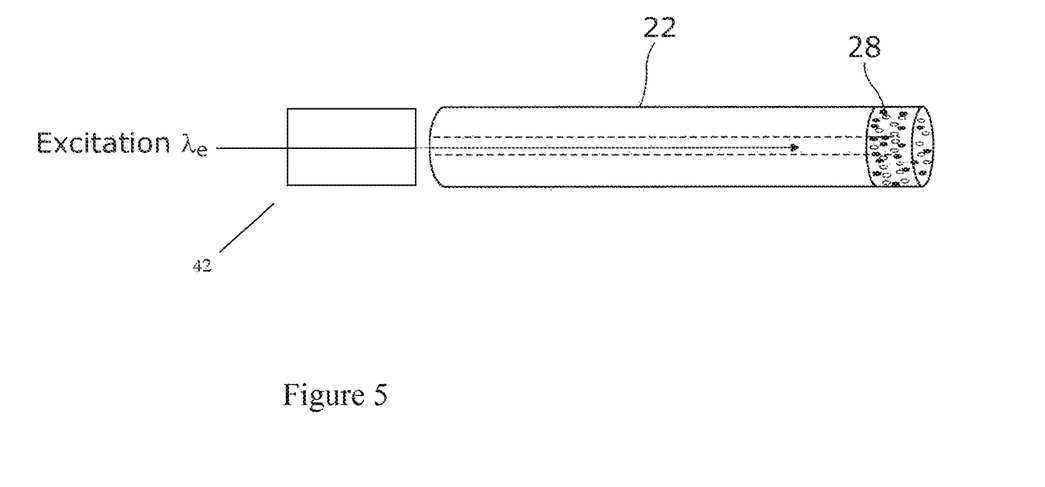
FIG. 5 shows anther embodiment of a sensor and a means for separating the wavelengths of emission from the fluorophores and excitation according to the present invention.

FIGS. 1 and 5 shows a sensor probe 20 which includes a large diameter fiber 22 having a fiber connector 24 to connect the fiber to a trichroic prism 40 (FIG. 1) or tricolor sensor 42 (FIG. 5). The large diameter fiber 22 has a tip 26 (shown in more detail in the exploded section) which terminates in an oxygen sensitive fluorescent material 28 which includes an oxygen sensitive dye and an oxygen insensitive dye wherein the dyes are both fluorophores. The large diameter fiber 22 is placed inside a tube 30 for protection. The tube has a breather vent 32 attachable thereto which includes a membrane to prevent liquid fuel from contacting the dual fluorophore tip 28.

Figure 2:
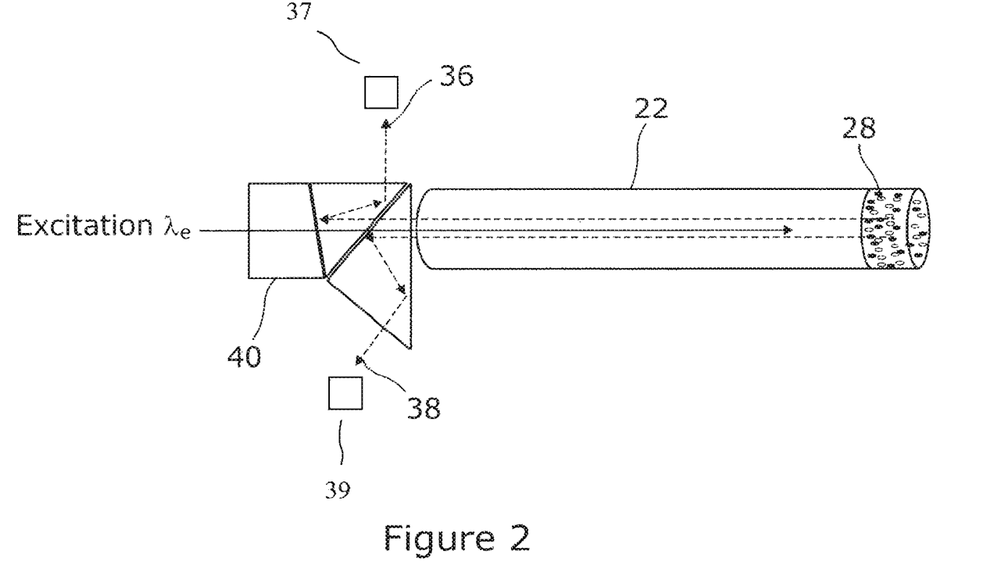
FIG. 2 shows a sensor and a means for separating the wavelengths of emissions from the fluorophores and excitation according to the present invention.

FIG. 2 shows a simplified version of the sensor probe shown in FIG. 1. The oxygen sensitive fluorescent material 28 is located at one end of the large diameter optical fiber 22. At the other end of the optical fiber 22 is a trichroic prism 40. Photons are sent through the prism 40 and are transmitted by the optical fiber 22 to excite the fluorophores in the tip 28. The emissions from the fluorophores are transmitted by the fiber 22 and are passed through a trichroic prism 40 to separate the three wavelengths made up of the excitation, the emission from the oxygen sensitive dye 36 and the oxygen insensitive dye 38. Two photodetectors 37,39 are used to convert the intensity or lifetime information into proportional currents I1 and I2. The current is then converted into voltage by transimpedance amplifiers.

Figure 3:
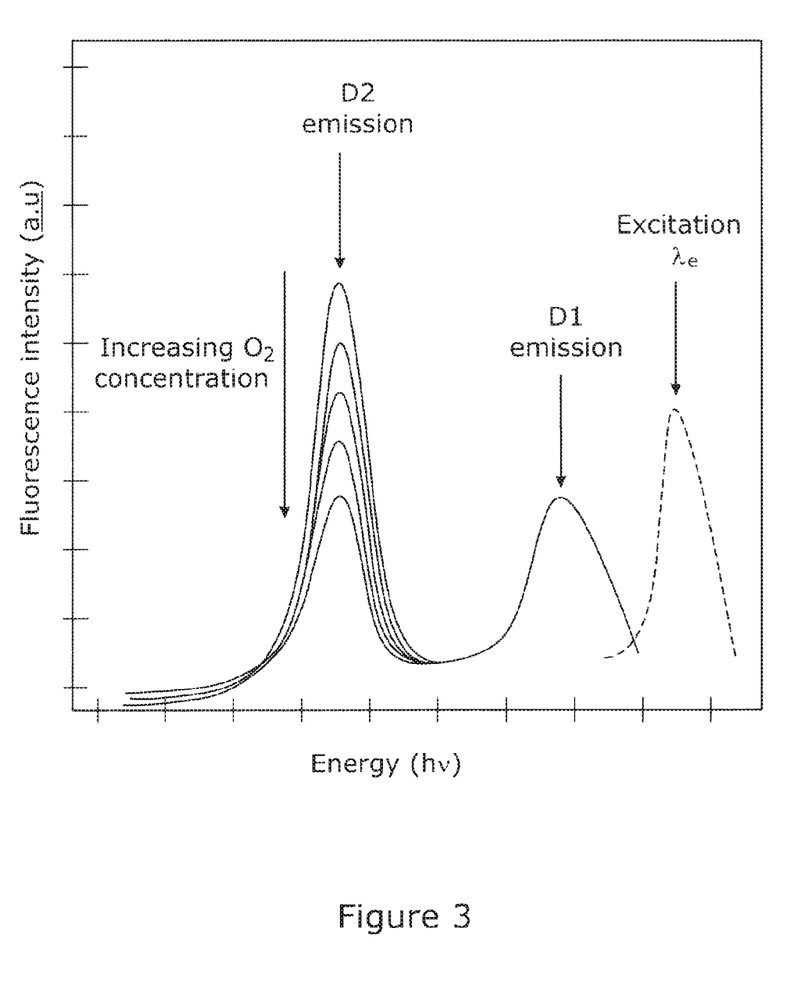
FIG. 3 shows an example of the fluorescent emission from two fluorophores.

FIG. 3 shows a graph of energy against fluorescence intensity. It can be seen that the intensity of the emission from the oxygen sensitive dye decreases and the oxygen concentration increases. However, the intensity of the emission from the oxygen insensitive dye remains unaffected by the change in oxygen concentration.

Figure 4:
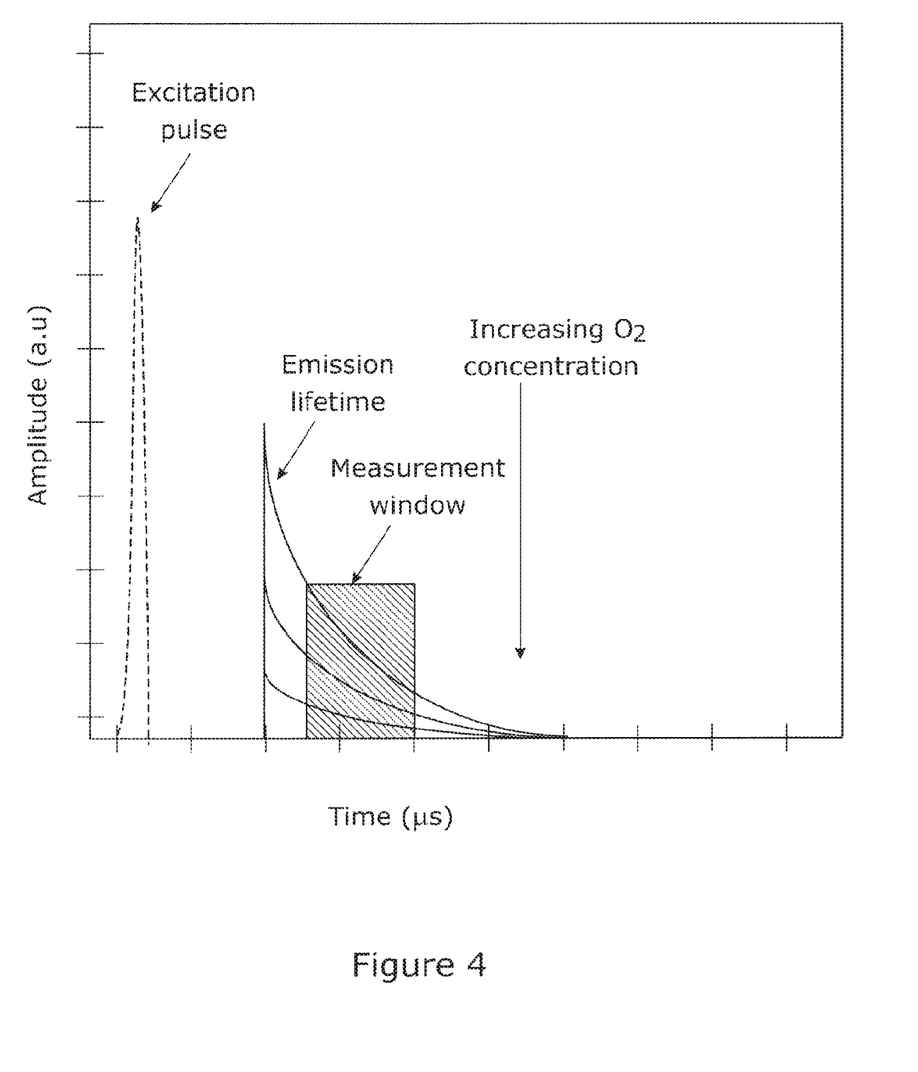
FIG. 4 shows a window of known time in which to measure the lifetime of an emission.

FIG. 4 shows a measurement window 50 of a known time in which the emission lifetime is measured. The total integrated intensity in the measurement window 50 gives a measurement of the oxygen concentration.

Same design of oxygen sensor as described and shown can be used for fuel tank as well as air separation module applications.

The features disclosed in the foregoing description, or the following claims, or the accompanying drawings, expressed in their specific forms or in terms of a means for performing the disclosed function, or in a method for attaining the disclosed result, as appropriate, may, separately, or in any combination of such features, be utilized for realizing the invention in diverse forms thereof.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise. Moreover, the recitation of "A, B, and/or C" or "at least one of A, B, or C" should be interpreted as including any singular entity from the listed elements, e.g., A, any subset from the listed elements, e.g., A and B, or the entire list of elements A, B, and C.

The invention claimed is:

1. An oxygen sensor for measuring an oxygen concentration in an aircraft application, the sensor comprising:
    an oxygen sensitive fluorescent material including an oxygen sensitive dye and an oxygen insensitive dye, the oxygen sensitive dye and an oxygen insensitive dye being fluorophores; and
    an optical fiber including a first end and a second end and being configured to transmit photons and transmit emissions from one or more of the fluorophores upon excitation thereof,
    wherein the oxygen sensitive fluorescent material is located on the first end of the optical fiber,
    wherein the optical fiber is connected, at its second end, to an excitation source configured to excite the fluorophores and to either (1) a trichroic prism and two photodetectors, or (2) a tricolor sensor, and
    wherein the trichroic prism or tricolor sensor is configured to:
        transmit the photons therethrough, the photons being further transmitted by the optical fiber to excite the fluorophores, and
        separate an excitation wavelength of the excitation source from an emission wavelength of each dye, wherein the excitation wavelength is pulsed to measure a lifetime of the emission.

2. The sensor of claim 1, wherein the optical fiber is housed in a tube.

3. The sensor of claim 2, wherein the tube includes a first tube end and a second tube end, one of which includes a rubber membrane and a breather vent attachable thereto.

4. The sensor of claim 3, wherein the rubber membrane is resistant to aerospace fuel and is permeable to gaseous oxygen.

5. The sensor of claim 1, wherein the oxygen sensitive dye is excitable at the same wavelength as the oxygen insensitive dye.

6. The sensor of claim 1, wherein the oxygen sensitive dye and oxygen insensitive dye are dispersed in a fuel resistant, oxygen-permeable rubber.

7. The sensor of claim 6, wherein the rubber comprises fluorosilicone rubber.

8. An apparatus for measuring an oxygen concentration in a fuel tank, the apparatus comprising:
    the sensor of claim 1,
    wherein the optical fiber is connected at the second end to the trichroic prism and the excitation source configured to excite the fluorophores.

9. The apparatus of claim 8, wherein an intensity or lifetime of fluorescence emitted by excited fluorophores is converted into proportional currents which are converted into voltages.

10. The apparatus of claim 9, further comprising:
    a transimpedance amplifier used to convert the proportional currents into voltages.

11. An apparatus for measuring an oxygen concentration in a fuel tank, the apparatus comprising:
    the sensor of claim 1,
    wherein the optical fiber is connected at the second end to the tricolor sensor and the excitation source configured to excite the fluorophores.

12. The apparatus of claim 11, wherein the tricolor sensor comprises an integrated RGB.

13. The sensor of claim 1, wherein the aircraft application includes a fuel tank application.

14. The sensor of claim 1, wherein the aircraft application includes an air separation module application.

* * * * *